(12) United States Patent
Shah et al.

(10) Patent No.: US 8,131,898 B2
(45) Date of Patent: Mar. 6, 2012

(54) EVENT HANDLING IN AN INTEGRATED EXECUTION ENVIRONMENT

(75) Inventors: Rishit Shah, Mountain View, CA (US); Rupen Chanda, San Francisco, CA (US); Govind Balakrishnan, Foster City, CA (US); Antonio Flores, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 8 days.

(21) Appl. No.: 12/789,246

(22) Filed: May 27, 2010

(65) Prior Publication Data

US 2011/0296057 A1    Dec. 1, 2011

(51) Int. Cl.
*G06F 3/02* (2006.01)
(52) U.S. Cl. .......................................... 710/73; 715/205
(58) Field of Classification Search .................. None
See application file for complete search history.

(56) References Cited

U.S. PATENT DOCUMENTS 7,479,949 B2 * 1/2009 Jobs et al. ..................... 345/173
(Continued)

*Primary Examiner* — Cheng-Yuan Tseng
(74) *Attorney, Agent, or Firm* — Fish & Richardson P.C.

(57) ABSTRACT

Methods, systems, and apparatus, including computer programs encoded on a computer storage medium, are described for handling input received from a common interface of a program and a runtime environment when both the program and the runtime environment are configured to consume the received input. Given that both a browser program and a media player program hosted by the browser program are configured to detect an event of a certain type, there may be a contention of whether the browser program or the media player program may act first on the detected event. The disclosed systems and techniques enable interpretation of a user's intent when the user interacts with a webpage hosting media content and when the user's input occurs over media content rendered by the media player program. Similar advantages may also be realized within the context of another execution environment, or other program, different than a browser program.

21 Claims, 5 Drawing Sheets

U.S. PATENT DOCUMENTS

| | | | |
|---|---|---|---|
| 7,788,583 B1 * | 8/2010 | Amzallag et al. | 715/719 |
| 7,954,064 B2 * | 5/2011 | Forstall et al. | 715/779 |
| 2009/0060452 A1 * | 3/2009 | Chaudhri | 386/95 |
| 2009/0061841 A1 * | 3/2009 | Chaudhri et al. | 455/420 |
| 2010/0218100 A1 * | 8/2010 | Simon et al. | 715/731 |
| 2011/0113354 A1 * | 5/2011 | Thiyagarajan et al. | 715/760 |

* cited by examiner

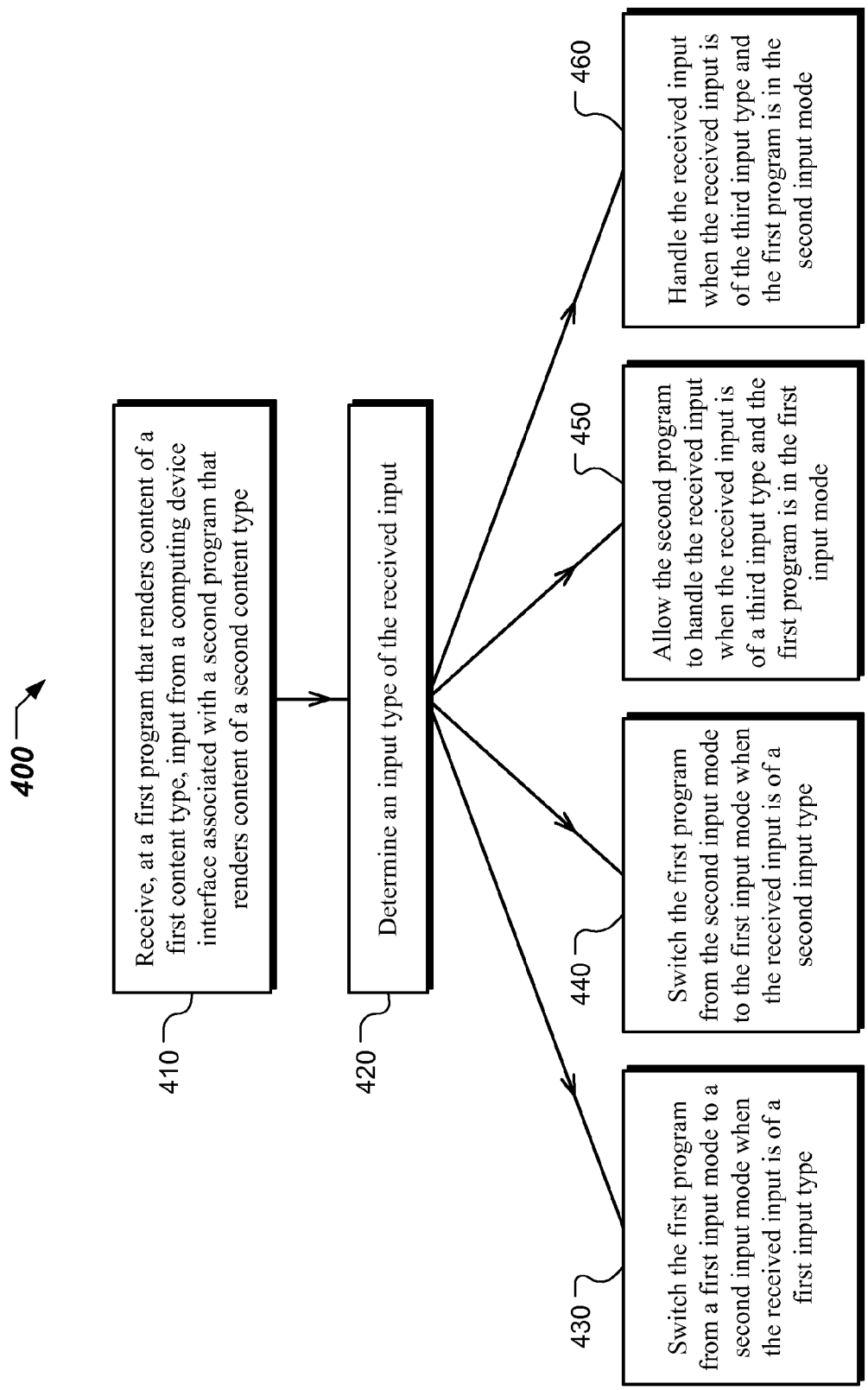

EVENT HANDLING IN AN INTEGRATED EXECUTION ENVIRONMENT

BACKGROUND

This specification relates to handling events that can be detected by and are meaningful to a program and to its execution environment.

A web browser is a software program for retrieving and presenting information resources on the World Wide Web. An information resource is typically identified by a Uniform Resource Locator (URL) and may be a web page, image, video, or other piece of content. Hyperlinks present in resources enable users to easily navigate their browsers to related resources. Aside from Hypertext Markup Language (HTML), browser programs can generally display any kind of content that can be part of a web page. Most browser programs can display images, audio, video, and XML (eXtensible Markup Language) files, and often have plug-ins to support media player programs, e.g., Flash applications and Java applets.

There may be situations, e.g., relating to touchscreen devices, when a media player program can handle the same events or gestures, e.g., double-tap, finger drag, and the like, as an underlying browser program that hosts the media player program.

SUMMARY

This specification describes technologies relating to handling input received from a common interface of a program and its execution environment when both the program and its execution environment are configured to consume the received input.

In general, one innovative aspect of the subject matter described in this specification can be embodied in methods that include the actions of receiving, at a first program that renders content of a first content type, input from a computing device interface associated with a second program that renders content of a second content type. The methods further include determining an input type of the received input. Furthermore, the methods include switching the first program from a first input mode to a second input mode when the received input is of a first input type. In addition, the methods include switching the first program from the second input mode to the first input mode when the received input is of a second input type. Additionally, the methods include allowing the second program to handle the received input when the received input is of a third input type and the first program is in the first input mode. The methods also include handling the received input when the received input is of the third input type and the first program is in the second input mode.

These and other implementations can include one or more of the following features. As part of determining the input type, the methods can include determining the received input to be of the first input type when the received input is a single input associated with content of the first content type. The methods can also include determining the received input to be of the second input type when the received input is a single input unassociated with content of the first content type. In addition, determining the input type can include determining the received input to be of the third input type when the received input is associated with content of the first content type and is different from the single input associated with content of the first content type.

In some implementations, receiving the input can include getting the received input from a touchscreen of a mobile device. Furthermore, the first program can be a media player program that operates within the second program. The second program can be a browser program, and the touchscreen can include a multi-touch device. The third input type can be associated with the first content type rendered by the media player program. Additionally, the third input type can include multiple subtypes including a double tap and a multi-touch input.

Other implementations of this aspect include corresponding systems, apparatus, and computer programs, configured to perform the actions of the methods, encoded on computer storage devices.

According to another aspect, the described subject matter can also be implemented in a system including a storage device that includes a first program that renders content of a first content type and a second program that renders content of a second content type. The system also includes one or more hardware processors configured to interact with a touchscreen device, execute the first and second programs and perform operations including receiving, by the first program, input from a computing device interface associated with the second program. The operations further include determining an input type of the received input. Furthermore, the operations include switching the first program from a first input mode to a second input mode when the received input is of a first input type. In addition, the operations include switching the first program from the second input mode to the first input mode when the received input is of a second input type. Additionally, the operations include allowing the second program to handle the received input when the received input is of a third input type and the first program is in the first input mode. The operations also include handling the received input when the received input is of the third input type and the first program is in the second input mode.

Particular embodiments of the subject matter described in this specification can be implemented so as to realize one or more of the following advantages. Given that both a browser program and a media player program hosted by the browser program are configured to detect an event of a certain type, there may be a contention of whether the browser program or the media player program may act first on the detected event. The systems and techniques disclosed in this specification enable interpretation of a user's intent when the user interacts with a webpage hosting media content and when the user's input occurs over media content rendered by the media player program. Similar advantages may also be realized within the context of another execution environment, or other program, different than a browser program.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4A shows an example of a method for handling inputs received through an interface shared by the first and second programs.

Like reference numbers and designations in the various drawings indicate like elements.

DETAILED DESCRIPTION

Figure 1:
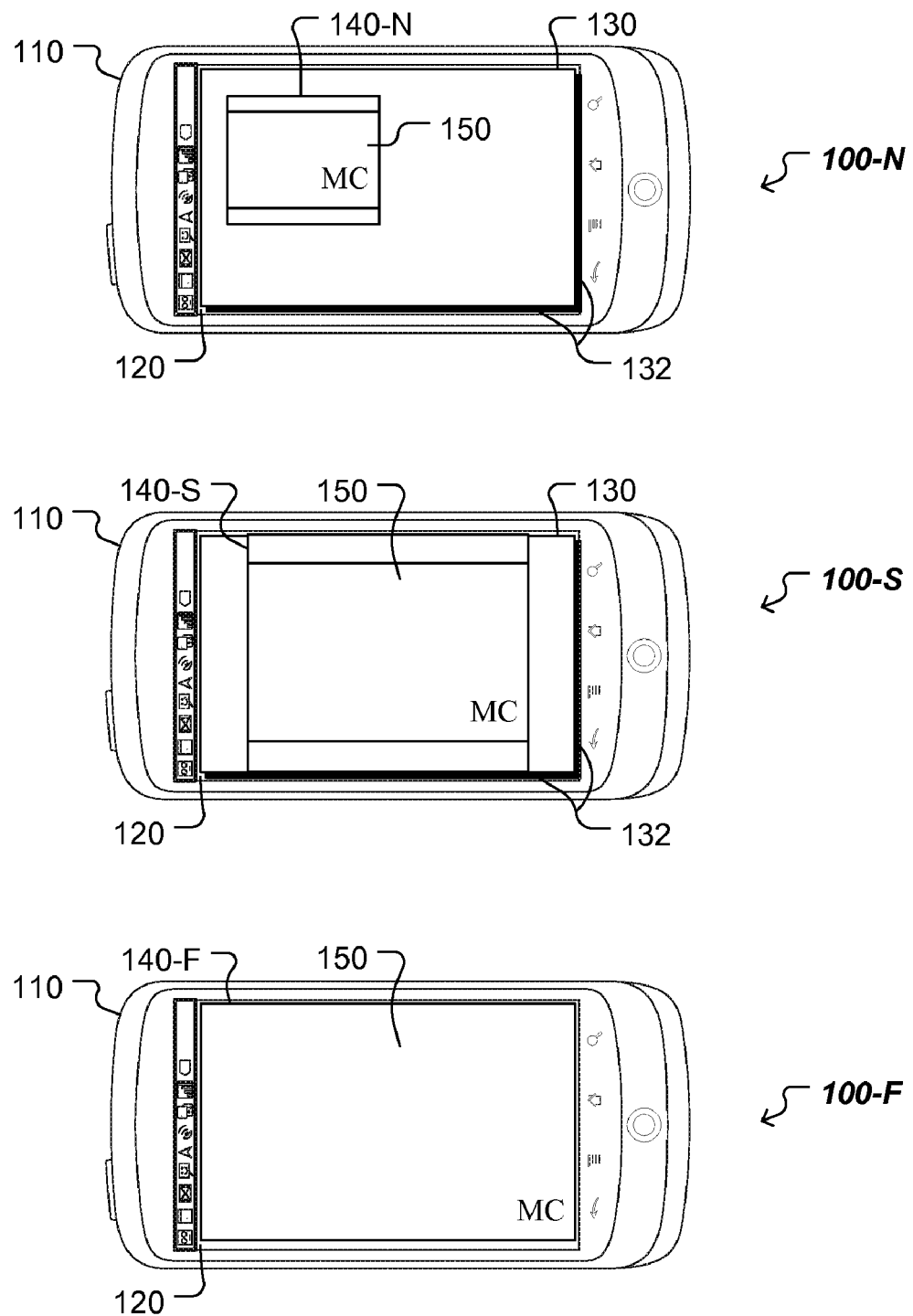
FIG. 1 shows various views of a first program running in a second program.

FIG. 1 shows diagrams 100-N, 100-S and 100-F corresponding to respective views of a first program hosted by a second program. Second program 130 is configured to render a second type of content to an interface device 120 of a mobile device 110. Second program 130 can have a graphical user interface (GUI) that can include a scrollbar 132 or other GUI mechanism to allow users associated with mobile device 110 to interactively select portions of the second type of content for display by second program 130. Second program 130 can be further configured to host a first program as described in detail below. In general, second program 130 can share a display space with the first program. In addition, the second program 130 can provide an execution environment (e.g., a cross-platform runtime environment) for the first program. For example, second program 130 can be a browser program configured to present webpages and to host one or more instances of a media player program.

A first program can be configured to render a first type of content 150 and to receive input from an interface device 120 associated with the second program 130. A flag attached to numerical reference "140" representing first program includes a letter associated with a corresponding view of the first program.

For example, diagram 100-N corresponds to a normal (N) view (or normal zoom) of first program 140-N. Second program 130 can host a normal view of first program 140-N in a predetermined region of interface device 120. For example, the predetermined region can be specified by HTML code of a webpage presented by the browser program.

Further, diagram 100-S corresponds to a view of first program 140-S called smart zoom. Second program 130 can place first program 140-S in smart zoom by scaling first program 140-S such that it is centered on interface device 120 and snaps to the devices dimensions while maintaining an aspect ratio of first type of content 150. In the case illustrated in diagram 100-S, smart zoom of the first program is accomplished by having the first program snap to a shorter of two dimensions of interface device 120. The smart zoom may also be referred to as fit-to-screen view.

Furthermore, diagram 100-F corresponds to a fullscreen (F) view (or fullscreen zoom) of first program 140-F. Underlying second program 130 is not visible on interface device 120 when first program 140-F is in fullscreen view. First program 140 can enter fullscreen view when a user associated with mobile device 110 chooses a button that calls a corresponding fullscreen-instruction to place the first program 140-F in fullscreen view. If the first program corresponds to a media player program, the instruction to "go fullscreen" may be provided via the media player program's scripting language, e.g., ActionScript (AS). Therefore, the fullscreen view is also referred to as AS-initiated fullscreen. The media player program is configured to render media content "MC", such as video, audio, and the like.

Browser programs configured to run on devices having touchscreens can use certain events and gestures to perform specific operations. For example, a double-tap or a pinch/zoom can result in zooming in/out of a webpage presented in the browser program, and a finger drag on screen can cause the webpage to pan. However, the same events and gestures can be used by a media player program for user input and user interaction with media content. Given that both the browser program and the media player program are configured to detect an event of a certain type, there may be contention between the browser program and the media player program regarding who should respond (at least initially) to the detected event. The systems and techniques disclosed in this specification enable interpretation of a user's intent when the user interacts with a webpage hosting media content and when the user's input occurs over media content rendered by the media player program.

To integrate playing of media content with browsing of a webpage, the media player can be configured to preserve a default user experience of using a browser on mobile device 110. For example, if user input includes gestures such as dragging or double-tapping on a touchscreen, then the browser can perform its default behavior even if the foregoing events take place over media content. However, to allow the media player program to act on these input events (drag, multi-touch and the like), the media player program can be configured to have a new mode called "focused" mode. The focused mode is in addition to an embedded mode and a fullscreen mode.

Figure 2:
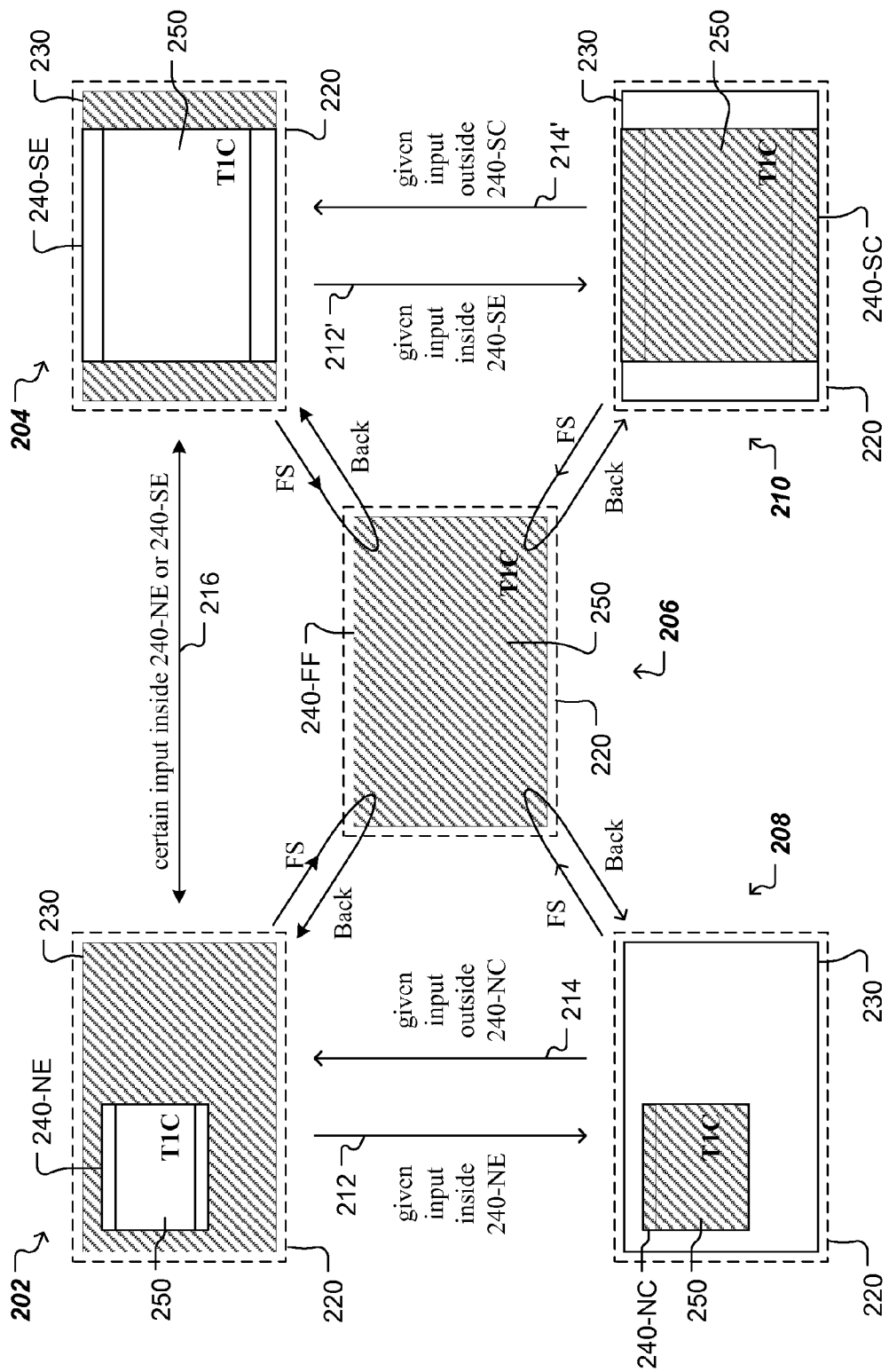
FIG. 2 shows diagrams of examples of views and modes of a first program running in a second program, where both programs render respective content to a computing device interface.

FIG. 2 shows diagrams 202, 204, 206, 208 and 210 of examples of views and modes of a first program running in a second program 230, where both programs render respective type-1 content "T1C" 250 and type-2 content to a computing device interface 220 associated with second program 230. A type-1 content 250 rendered by the first program can be different from a type-2 content rendered by second program 230. For example, computing device interface 220 can correspond to a touchscreen of mobile device 110. Second program 230 can correspond to a browser program, and the type-2 content can represent webpages (e.g., HTML code) rendered by the browser program. Further, the first program can correspond to a media player program, and type-1 content 250 can represent media content (e.g., multimedia bytecode) rendered by the media player program.

A numerical reference "240" of the first program includes a first letter associated with a corresponding view of the first program and a second letter associated with a corresponding mode of the first program. Examples of views are normal (N), smart zoom (S) and fullscreen (F) as described in FIG. 1, for instance. Examples of modes of first program 240 are embedded (E), focused (C) and fullscreen (F). Further referring to FIG. 2, a pattern-filled-box represents a program in focus mode (i.e., the program has priority over another program in consuming input received via common input interface 220) and a white-box represents a program in embedded mode (i.e., the program defers to another program consuming input received via common input interface 220).

First program 240-NE can be in normal view and in embedded mode (as shown in diagram 202.) Further, first program 240-SE can be in smart zoom and in embedded mode (as shown in diagram 204.) While being in embedded mode and independent of its view, the first program (240-NE or 240-SE) can defer execution of input received through computing device interface 220 to second program 230, even when the received input is detected in a region of type-1 content 250. Based on the correspondences described above, diagrams 202 and 204 correspond to an embedded mode of the media player program in normal view and in smart zoom, respectively. Embedded mode can be the default mode of the media player program hosted by a browser program. In this mode, the media player program can be embedded among HTML content on the webpage, and renders media content. In some implementations, the media player program can be configured to load on a webpage in embedded mode.

Additionally, first program 240-FF can be in fullscreen view and in fullscreen mode (as shown in diagram 206.) Under these circumstances, first program 240-FF can execute input instructions received through computing device interface 220. Based on the correspondences described above, diagram 206 corresponds to a fullscreen mode of a media player program in fullscreen view. In some implementations, the media player program is configured to load in fullscreen mode, such that media content fills 100% of the width and height of the touchscreen. Moreover, the fullscreen mode of the media player program can have limited keyboard events.

First program 240-NC can be in normal view and in focused mode (as shown in diagram 208.) Further, first program 240-SC can be in smart zoom and in focused mode (as shown in diagram 210.) While being in focused mode and independent of its view, the first program (240-NC or 240-SC) can execute input instructions received through computing device interface 220, when the received input is detected in a region of type-1 content 250. Based on the correspondences described above, diagrams 208 and 210 correspond to a focused mode of the media player program in normal view and in smart zoom, respectively. Focused mode is another mode of the media player program that can be used on devices that include a touchscreen. The media player program that renders media content on the touchscreen can enter focused mode when a user performs a single-tap over media content. Once in focused mode, the media player program can receive overloaded events such as drag and multi-touch. The media player program can exit focused mode when the user taps on an area outside a touchscreen region of the media player program.

A combination of fullscreen view and fullscreen mode (as shown in diagram 206) of first program 240-FF is equivalent to a focused mode, because no portion of second program 230 is displayed on computing device interface 220. Therefore, when the media player program is loaded in fullscreen mode, and covers 100% width and height of the touchscreen, the media player program is automatically placed in focused mode, as no portion of the browser program is displayed on the touchscreen 12, so no HTML content may be zoomed/ panned by a user associated with mobile device 110.

The first program is configured to remain in normal view (smart zoom) as it transitions 212 (212') from embedded mode 240-NE (240-SE) to focused mode 240-NC (240-SC). Transition 212 (212') can be triggered by a given input associated with type-1 content 250, i.e., the given input is received by the first program 240-NE (240-SE) inside a region of type-1 media content 250. The foregoing example of input can represent a first input type. Further, the first program is configured to remain in normal view (smart zoom) as it transitions 214 (214') from focused mode 240-NC (240-SC) to embedded mode 240-NE (240-SE'). Transition 214 (214') can be triggered by the given input associated with type-2 content, i.e., the given input is received by second program 230 outside the region of type-1 content 250 rendered by first program 240-NC (240-SC). The foregoing example of input can represent a second input type.

For example, the given input corresponding to mobile device 110 can be a single tap, and a first input type can be a single tap event detected inside a region of the touchscreen corresponding to media content. Receiving an input of a first input type can cause the media player program to respond in different ways depending on its mode (and independently of its view) at a time when the input of first input type is received. The response of the media player program to the received input of first input type is based on a protocol included in Table 1.

TABLE 1

Media player program receives single tap inside region of media content

| Media player is in EMBEDDED mode - Browser has priority | Media player is in FOCUSED mode - Media player has priority | Media player is in FULLSCREEN mode - Media player has priority |
|---|---|---|
| (i) Media player transitions to focused mode. (ii) Additionally, media player receives and consumes touch down & touch up events. | Media player receives and consumes touch down & touch up events. | Media player receives and consumes touch down & touch up events. |

A second input type can be a single tap gesture detected outside a region of the touchscreen corresponding to media content. Receiving an input of second input type by the browser program can cause the media player program to respond in different ways depending on its mode (and independently of its view) at a time when the input of second input type is received. The response of the media player program to the input of second input type received by the browser program is based on a protocol included in Table 2.

TABLE 2

Browser program receives single tap outside region of media content

| Media player is in EMBEDDED mode - Browser has priority | Media player is in FOCUSED mode - Media player has priority | Media player is in FULLSCREEN mode - Media player has priority |
|---|---|---|
| Browser receives and consumes touch down & touch up events. | Media player transitions to embedded mode. | N/A |

Additionally, a third input type corresponds to an input associated with type-1 content 250, i.e., input that is received inside the first program, and the received input is consumed by first program (240-NC or 240-SC) when first program is in focused mode, or is consumed by second program 230 when first program (240-NE or 240-SE) is in embedded mode.

Examples of inputs of third input type are described below. The first program is configured to remain in embedded mode as it transitions back and forth 216 between normal view 240-NE and smart-zoom 240-SE. Transition 216 can be triggered by a certain input associated with type-1 content 250, i.e., the certain input is received inside a region of type-1 content 250. When the first program is in focused mode, it is configured to not transition between normal view 240-NC and smart-zoom 240-SC upon receiving the certain input associated with type-1 content 250. The transition between views may not occur because first program 240-NC (240-SC) which is in focused mode consumes any input associated with type-1 content 250, i.e., any input received by first program 240-NE (240-SE) inside a region of type-1 media content 250.

For example, the certain input corresponding to mobile device 110 can be a double tap. Receiving a double tap gesture inside a region of the touchscreen corresponding to media content can cause the media player program to respond in different ways depending on its mode and on its view at a time when the double tap is received. The response of the media player program to the received double tap inside of media content is based on a protocol included in Table 3.

TABLE 3

Media player program receives double tap inside region of media content

| Media player is in EMBEDDED mode - Browser has priority | Media player is in FOCUSED mode - Media player has priority | Media player is in FULLSCREEN mode - Media player has priority |
|---|---|---|
| When media player's view is NORMAL: Browser places media player in smart-zoom. Media player does not transition to focused mode. When media player's view is SMART-ZOOM: Browser returns media player to normal view. Media player does not transition to focused mode. | Media player executes instructions corresponding to double tap event. If the double tap event is not consumed by the media player, the double tap is dispatched back to the browser to perform the corresponding browser operation. For example, zoom in/out. | Media player receives and consumes double tap event. If the double tap event is not consumed by the media player, then no operation is performed. |

Other examples of inputs of third type input are described below in connection with mobile device 110. For example, an input of third type input corresponding to mobile device 110 can be a drag event. Receiving a drag event inside a region of the touchscreen corresponding to media content can cause the media player program to respond in different ways depending on its mode (and independently of its view) at a time when the drag event is received. The response of the media player program to the received drag event inside of media content is based on a protocol included in Table 4.

TABLE 4

Media player program receives drag event inside region of media content

| Media player is in EMBEDDED mode - Browser has priority | Media player is in FOCUSED mode - Media player has priority | Media player is in FULLSCREEN mode - Media player has priority |
|---|---|---|
| Browser receives drag event and performs the corresponding browser operation, e.g., pan the page. | Media player receives drag event. If the drag event is not consumed by the media player, the drag event is dispatched to the browser to perform the corresponding browser operation, e.g., pan the page. | Media player receives drag event. If the drag event is not consumed by the media player, then no operation is performed. |

Another example of input of third type input corresponding to the mobile device can be a multi-touch gesture. Receiving a multi-touch event inside a region of the touchscreen corresponding to media content can cause the media player program to respond in different ways depending on its mode (and independently of its view) at a time when the multi-touch is received. The response of the media player program to the received drag event inside of media content is based on a protocol included in Table 5.

TABLE 5

Media player program receives multi-touch event inside region of media content

| Media player is in EMBEDDED mode - Browser has priority | Media player is in FOCUSED mode - Media player has priority | Media player is in FULLSCREEN mode - Media player has priority |
|---|---|---|
| Browser receives multi-touch event and performs the corresponding browser operation, e.g., pinch/zoom behavior. | Media player receives multi-touch event. If the multi-touch event is not consumed by the media player, the multi-touch event is dispatched to the browser to perform the corresponding browser operation, e.g., pinch/zoom behavior. | Media player receives multi-touch event. If the multi-touch event is not consumed by the media player, then no operation is performed. |

A further example of input of third type input corresponding to mobile device 110 can be a rotate-screen event. Receiving a rotate-screen by the media player program can cause the media player program to respond in different ways depending on its mode (and independently of its view) at a time when the rotate-screen event is received. The response of the media player program to the received rotate screen event is based on a protocol included in Table 6.

TABLE 6

Media player program receives rotate-screen event

| Media player is in EMBEDDED mode - Browser has priority | Media player is in FOCUSED mode - Media player has priority | Media player is in FULLSCREEN mode - Media player has priority |
|---|---|---|
| Browser receives rotate screen event and performs orientation change. Embedded mode and view of media player (normal or smart zoom) are preserved. | Browser receives rotate screen event and performs orientation change. Focused mode and view of media player (normal or smart zoom) are preserved after orientation change. | Media player remains in fullscreen mode after orientation change. |

An additional example of input of third type input corresponding to mobile device 110 can be a back-key event. Receiving a back-key input by the media player program can cause the media player program to respond in different ways depending on its mode (and independently of its view) at a time when the back-key event is received. The response of the media player program to the received back-key event is based on a protocol included in Table 7.

TABLE 7

Media player program receives back-key event

| Media player is in EMBEDDED mode - Browser has priority | Media player is in FOCUSED mode - Media player has priority | Media player is in FULLSCREEN mode - Media player has priority |
|---|---|---|
| Browser receives back-key event and presents previously visited web page. If so, media player instance may be automatically shut down. | Browser receives back-key event and presents previously visited web page. If so, media player instance may be automatically shut down. | Media player exits fullscreen mode and transitions to focused mode. The media player view is either normal or smart-zoom based on its view prior to FULLSCREEN mode/view. |

Another example of input of third type input corresponding to mobile device 110 can be a Navigation keys/D-pad event.

Receiving a Navigation keys/D-pad event by the media player program can cause media player program to respond in different ways depending on its mode (and independently of its view) at a time when the Navigation keys/D-pad event is received. The response of the media player program to the received Navigation keys/D-pad event is based on a protocol included in Table 8.

TABLE 8

Media player program receives navigation keys/D-pad event

| Media player is in EMBEDDED mode - Browser has priority | Media player is in FOCUSED mode - Media player has priority | Media player is in FULLSCREEN mode - Media player has priority |
| --- | --- | --- |
| Browser receives navigation keys/D-pad event and performs default navigation, e.g., shifts focus to next HTML object on page. | Media player receives navigation keys/D-pad event. | Media player receives navigation keys/D-pad event. |

A further example of input of third type input corresponding to mobile device 110 can be a keyboard input. Receiving a keyboard input by the media player program can cause the media player program to respond in different ways depending on its mode (and independently of its view) at a time when the keyboard input is received. The response of the media player program to the received keyboard input is based on a protocol included in Table 9.

TABLE 9

Media player program receives keyboard input

| Media player is in EMBEDDED mode - Browser has priority | Media player is in FOCUSED mode - Media player has priority | Media player is in FULLSCREEN mode - Media player has priority |
| --- | --- | --- |
| Browser receives keyboard input and performs default operation. | Media player receives keyboard input and performs default operation. | Media player receives keyboard input and performs default operation. Restrictions apply for which inputs get dispatched in Actionscript. |

There may be cases where (i) a user zooms a webpage such that the entire touchscreen can be occupied by the media player program and (ii) media content can handle drag events. In such cases, a user can view media content, but cannot pan the webpage. To address this, a context menu of the media player program can include an option to enable the user to switch back to the media player program's normal view. A normal view of the media player program allows the user to navigate around the underlying webpage.

Tables 1-9 indicate that the media player program, while it is in focused mode, can be configured to receive a double tap and to respond to the received double tap. However, if the double tap event cannot be consumed by the media player program, then the double tap event can be dispatched back to the browser program and the default double tap browser operation can take place. A potential benefit of this approach is that the event handling workflow is consistent with handling of other overloaded events such as drag and multi-touch.

Another potential benefit of dispatching events that are unconsumed by the media player program back to the browser program is that such practice precludes the requirement that webpages include HTML attributes/instructions to override browser's default double-tap behavior. In some implementations, the media player program can be configured to ignore double click instructions to allow the browser program to handle double-tap events. A double tap event to instruct text selection is an exception as it is done by C++ code. In other implementations, the media player program can be configured to disallow the browser program from responding to a double tap instruction either by (i) adding an empty double tap listener or by (ii) adding a viewport metatag (in HTML instructions of the webpage) and setting the viewport metatag to "user-scalable=no" to avoid browser zooming.

In some implementations, a visual indicator can be added to an instance of the media player program that is in focused mode. However, when in some cases a visual indicator may interfere with the overall viewing experience, no visual indicator can be appended to a media player program that is in focus. If the media player program consumes drag or double-tap events, then some changes in a display state of media content can serve as a visual feedback to the user that the media player program is in focus mode.

Figure 3:
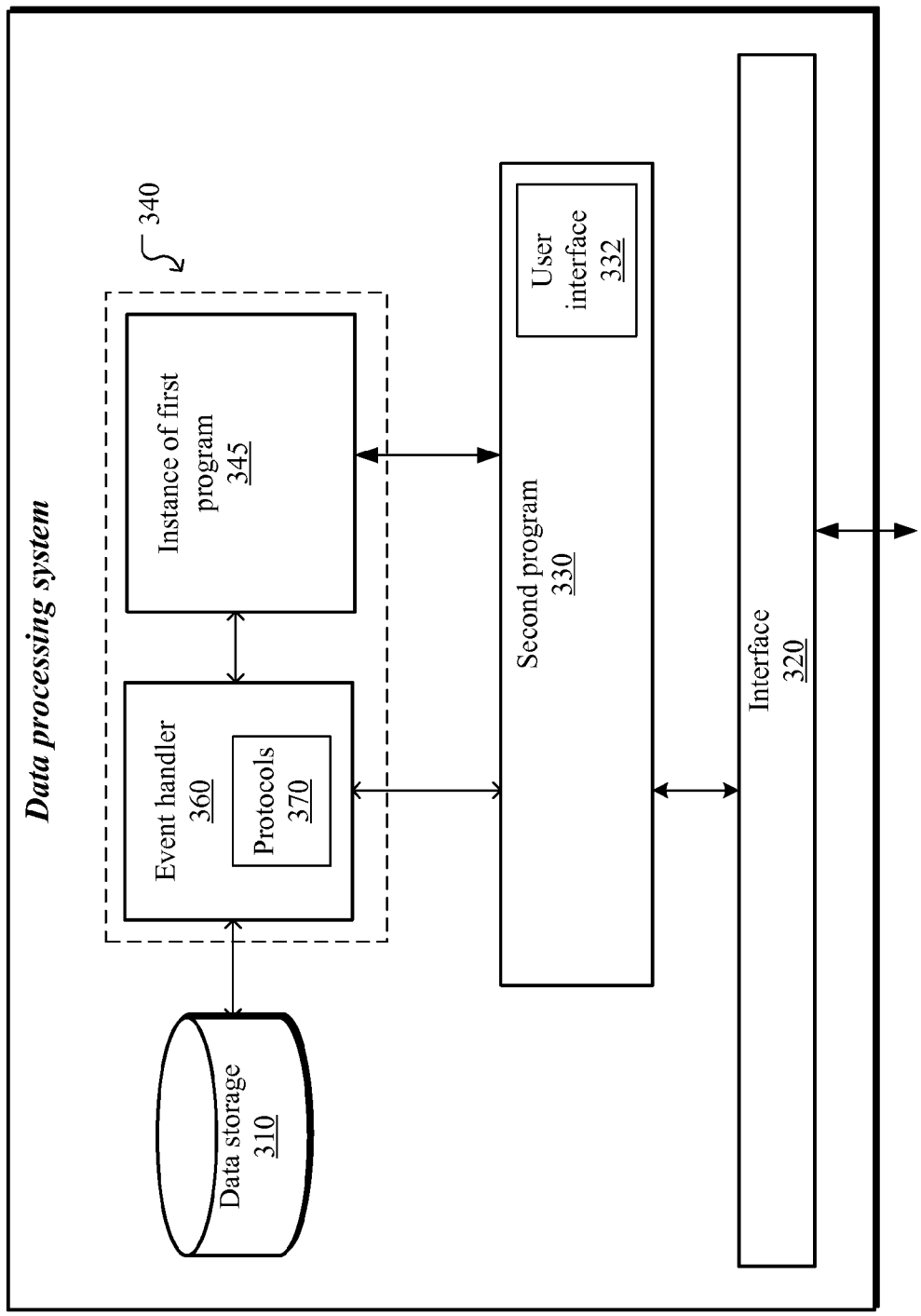
FIG. 3 shows a schematic diagram of an example of a system for handling inputs received through an interface shared by the first and second programs.

FIG. 3 shows a schematic diagram of an example of a data processing system 300 for handling inputs received through an interface 320 shared by a first program 340 and a second program 330. Data processing system 300 can represent another implementation of systems described above. For example, first program 340 and its instance 345 can correspond to the first program (e.g., a media player program) and any one of its views 140-N, 140-S or 140-F as described in FIG. 1. Furthermore, second program 330 and its user interface 332 can respectively correspond to second program 130 and its user interface 132 (e.g., a browser program). Also, interface 320 of data processing system 300 can correspond to interface device 120 (e.g., a touchscreen) of mobile device 110. Moreover, first program 340 and its instance 345 can correspond to the first program and any one of its views/modes 240-NE, 240-SE, 240-NC, 240-SC or 240-F illustrated in diagrams 202, 204, 206, 208 and 210, respectively, of FIG. 2. Furthermore, second program 330 can correspond to the previously described second program 230. Also, interface 320 of data processing system 300 can correspond to computing interface 220 associated with second program 230.

First program 340 can use an event handler 360 to determine an input type received from interface 320 associated with second program 330. Further, event handler 360 is configured to resolve potential contentions between first program 340 and second program 330 when the received input type can be executed by either the first program 340 or the second program 330. Event handler 360 can be operated by implementing methods 400 and 422 described in detail below in connection with FIGS. 4A and 4B. Moreover, event handler can resolve the potential contentions based on protocols 370 for handling multiple input types. For example, first program can execute instructions relating to a given input if an input mode of first program 340 is of a certain type. Multiple protocols 370 were described in detail above, in connection with Tables 1-9. Further, protocols 370 can be stored in a data storage device 310 of data processing system 300. Note that, although shown as part of first program 340 (represented by the dashed-line rectangle), all or part of event handler 360 can be implemented as a separate program from first program 340.

FIG. 4 shows an example of a method 400 for handling inputs received through an interface shared by first and second programs. Method 400 can be implemented, for example, in system 300. Additionally, method 400 can be implemented in the systems described in connection with FIGS. 1-3. For example, the first program can be a media player program that operates within the second program. Further, the second program can be a browser program.

Method 400 includes receiving 410, at a first program that renders content of a first content type, input from a computing device interface associated with a second program that renders content of a second content type. The first content type can be media content rendered by the media player program. The media content can include movies, audio, and the like. The second type of content can be a webpage including, for example, text, still images, and the like. The computing device interface through which inputs are received can be a touchscreen of a mobile device. Further, the touch screen can be associated with the browser program.

Method 400 continues with an event handler determining 420 an input type of the received input. Example implementations of determining 420 the input type are described below in connection with FIG. 4B.

When the input is determined 420 to be of a first input type, method 400 can include switching 430, by the event handler, the first program from a first input mode to a second input mode. The first input type is described below in connection with FIG. 4B. The first and second input modes can correspond to embedded and focused modes, respectively, of the media player program that operates within a browser program. In such case, switching 430 can represent switching the media player program from embedded mode to focused mode.

When the input is determined 420 to be of a second input type, method 400 can include switching 440, by the event handler, the first program from the second input mode to the first input mode. The second input type is described below in connection with FIG. 4B. Further, switching 440 can represent switching the media player program from focused mode back to embedded mode.

When the input is determined 420 to be of a third input type and the first program is in the first input mode, method 400 can include allowing 450, by the event handler, the second program to handle the input. Multiple examples of the third input type were described above in connection with Tables 3-9. For example, the third input type can include multiple subtypes including a double tap and a multi-touch input. Furthermore, allowing 450 can represent allowing the browser program to handle, e.g., the double tap or the multi-touch input received through the touchscreen of the mobile device.

When the input is determined 420 to be of the third input type and the first program is in the second input mode, method 400 continues with the first program handling 460 the received input. For example, handling 460 can represent handling by the media player program, e.g., the double tap or the multi-touch input received through the touchscreen of the mobile device.

Figure 4B:
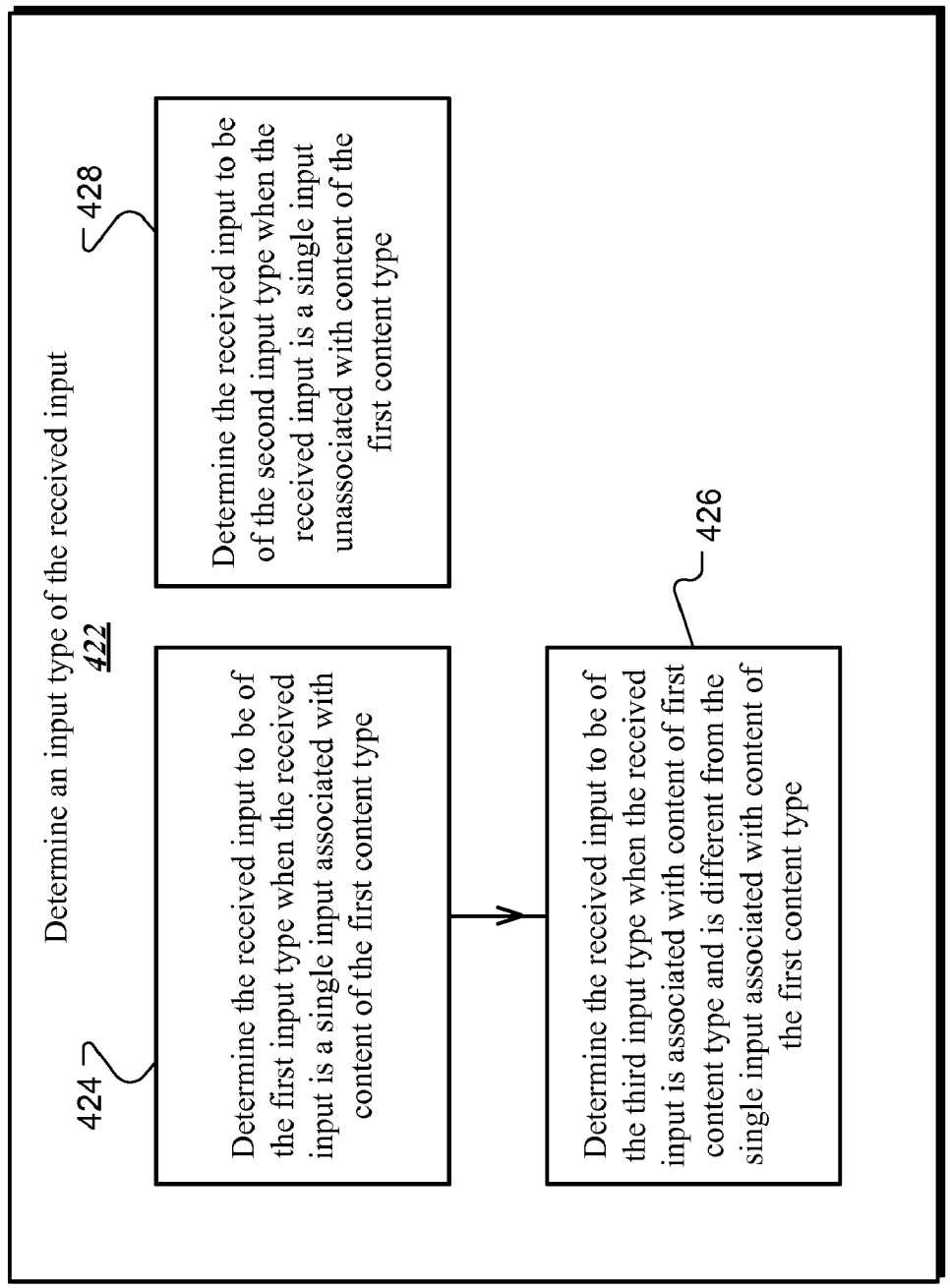
FIG. 4B shows aspects of the method handling inputs received through an interface shared by the first and second programs.

FIG. 4B shows aspects of method 400 for handling inputs received through an interface shared by the first and second programs. For example, determining 420 the input type of the received input can be implemented as method 422.

When the input is a single input associated with content of the first content type, the event type determination 422 can include determining 424 the input to be of the first input type. For example, the first input type can correspond to a single tap received inside a region of the touchscreen corresponding to media content rendered by the media player program. This example was described in detail above, in connection with Table 1.

When the input is associated with content of first content type and the input is different from the single input associated with content of the first content type, the event type determination 422 can further include determining 426 the input to be of the third input type. For example, the third input type can correspond to gestures and/or events that are different from a single tap and that are received inside a region of the touchscreen corresponding to media content rendered by the media player program. Examples of the third input type, such as double tap, drag, multi-touch, and the like, were described in detail above, in connection with Tables 3-9.

When the input is a single input unassociated with content of the first content type, the event type determination 422 can include determining 428 the input to be of the second input type. For example, the second input type can correspond to a single tap received outside a region of the touchscreen corresponding to media content rendered by the media player program. For example, outside the region corresponding to the media content can be a region of the touchscreen corresponding to content of a webpage. This example was described in detail above, in connection with Table 2.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
rendering media content at a media player program operating within a browser program that renders webpage content, such that the media content and a portion of the webpage content different from the media content are being rendered concurrently;
receiving, at the media player program, a first input from a touchscreen of a mobile device, the touchscreen representing an interface associated with the browser program;
switching the media player program from an embedded input mode to a focused input mode when the first input is a single input received inside a region of the touchscreen corresponding to the media content, and
switching the media player program from the focused input mode to the embedded input mode when the first input is a single input received inside another region of the touchscreen corresponding to the portion of the webpage content different from the media content,
wherein the media content and the portion of the webpage content different from the media content remain concurrently rendered after said switching the media player program between the embedded and focused input modes;
receiving, at the media player program, a second input from the touchscreen, the second input being different from the first input; and
allowing the browser program to handle the received second input when the media player program has been switched from the focused input mode to the embedded first input mode, and
handling the received second input when the media player program has been switched from the embedded input mode to the focused input mode.

2. The method of claim 1, where the single input, in either the region or the other region, represents a single tap gesture.

3. The method of claim 1, where the second input is a double tap gesture received inside the region of the touchscreen corresponding to the media content after the media player program has been switched from the embedded mode to the focused mode, and the method further comprises
zooming the media content, by the media player in response to the received second input, while the browser program maintains un-zoomed the portion of the webpage content different from the media content.

4. The method of claim 1, where the media content comprises a video, and the portion of the webpage content different from the media content comprises text.

5. The method of claim 1, where the touchscreen comprises a multi-touch device, the second input is a multi-touch input comprising a pinch-zoom gesture received inside the region of the touchscreen corresponding to the media content after the media player program has been switched from the embedded mode to the focused mode, and the method further comprises
zooming the media content, by the media player in response to the received second input, while the browser program maintains un-zoomed the portion of the webpage content different from the media content.

6. The method of claim 1, where the second input is one of a drag gesture or a swipe gesture received inside the region of the touchscreen corresponding to the media content after the media player program has been switched from the embedded mode to the focused mode, and the method further comprises
panning the media content, by the media player in response to the received second input, while the browser program maintains un-panned the portion of the webpage content different from the media content.

7. The method of claim 1, where the touchscreen comprises a multi-touch device, the second input is a multi-touch rotate gesture received inside the region of the touchscreen corresponding to the media content after the media player program has been switched from the embedded mode to the focused mode, and the method further comprises
rotating the media content, by the media player in response to the received second input, while the browser program maintains un-rotated the portion of the webpage content different from the media content.

8. A device comprising:
a computer storage medium encoding a media player program and a browser program; and
one or more hardware processors configured to interact with a touchscreen device, where
the touchscreen device represents an interface associated with the browser program, and
the one or more hardware processors are further configured to execute the media player program within the browser program, and to perform operations comprising:
rendering media content within webpage content, such that the media content and a portion of the webpage content different from the media content are being rendered concurrently;
receiving, by the media player program, a first input from the touchscreen device;
switching the media player program from an embedded input mode to a focused input mode when the first input is a single input received inside a region of the touchscreen device corresponding to the media content, and
switching the media player program from the focused input mode to the embedded input mode when the first input is a single input received inside another region of the touchscreen device corresponding to the portion of the webpage content different from the media content,
wherein the media content and the portion of the webpage content different from the media content remain concurrently rendered after said switching the media player program between the embedded and focused input modes;
receiving, by the media player program, a second input from the touchscreen device, the second input being different from the first input; and
allowing the browser program to handle the received second input when the media player program has been switched from the focused input mode to the embedded input mode, and
handling the received second input when the media player program has been switched from the embedded input mode to the focused input mode.

9. The device of claim 8, where
the media content comprises a video, and
the portion of the webpage content different from the media content comprises text.

10. The device of claim 8, where the single input, in either the region or the other region, represents a single tap gesture.

11. The device of claim 8, where
the second input is a double tap gesture received inside the region of the touchscreen device corresponding to the media content after the media player program has been switched from the embedded mode to the focused mode, and the operations further comprise zooming the media content, by the media player in response to the received second input, while the browser program maintains un-zoomed the portion of the webpage content different from the media content.

12. The device of claim 8, where
the second input is one of a drag gesture or a swipe gesture received inside the region of the touchscreen device corresponding to the media content after the media player program has been switched from the embedded mode to the focused mode, and
the operations further comprise panning the media content, by the media player in response to the received second input, while the browser program maintains un-panned the portion of the webpage content different from the media content.

13. The device of claim 8, where
the touchscreen device comprises a multi-touch device,
the second input is a pinch-zoom received inside the region of the touchscreen device corresponding to the media content after the media player program has been switched from the embedded mode to the focused mode, and
the operations further comprise zooming the media content, by the media player in response to the received second input, while the browser program maintains un-zoomed the portion of the webpage content different from the media content.

14. The device of claim 8, where
the touchscreen device comprises a multi-touch device,
the second input is a multi-touch rotate gesture received inside the region of the touchscreen device corresponding to the media content after the media player program has been switched from the embedded mode to the focused mode, and
the operations further comprise rotating the media content, by the media player in response to the received second input, while the browser program maintains un-rotated the portion of the webpage content different from the media content.

15. A non-transitory computer storage medium encoding instructions of a media player program and a browser program that when executed by data processing apparatus cause the data processing apparatus to perform operations comprising:
rendering media content by media player program executing within the browser program that renders webpage content, such that the media content and a portion of the webpage content different from the media content are being rendered concurrently;
receiving, by the media player program, a first input from a touchscreen, where the touchscreen represents an interface associated with the browser program;
switching the media player program from an embedded input mode to a focused input mode when the first input is a single input received inside a region of the touchscreen corresponding to the media content, and
switching the media player program from the focused input mode to the embedded input mode when the first input is a single input received inside another region of the touchscreen corresponding to the portion of the webpage content different from the media content,
wherein the media content and the portion of the webpage content different from the media content remain concurrently rendered after said switching the media player program between the embedded and focused input modes;
receiving, at the media player program, a second input from the touchscreen, the second input being different from the first input; and
allowing the browser program to handle the received second input when the media player program has been switched from the focused input mode to the embedded input mode, and
handling the received second input when the media player program has been switched from the embedded input mode to the focused input mode.

16. The non-transitory computer storage medium of claim 15, where the media content comprises a video, and the portion of the webpage content different from the media content comprises text.

17. The non-transitory computer storage medium of claim 15, where the single input, in either the region or the other region, represents a single tap gesture.

18. The non-transitory computer storage medium of claim 15, where the second input is a double tap gesture received inside the region of the touchscreen corresponding to the media content after the media player program has been switched from the embedded mode to the focused mode, and the operations further comprise
zooming the media content, by the media player in response to the received second input, while the browser program maintains un-zoomed the portion of the webpage content different from the media content.

19. The non-transitory computer storage medium of claim 15, where the second input is one of a drag gesture or a swipe gesture received inside the region of the touchscreen corresponding to the media content after the media player program has been switched from the embedded mode to the focused mode, and the operations further comprise
panning the media content, by the media player in response to the received second input, while the browser program maintains un-panned the portion of the webpage content different from the media content.

20. The non-transitory computer storage medium of claim 15, where the touchscreen comprises a multi-touch device, the second input is a pinch-zoom received inside the region of the touchscreen corresponding to the media content after the media player program has been switched from the embedded mode to the focused mode, and the operations further comprise
zooming the media content, by the media player in response to the received second input, while the browser program maintains un-zoomed the portion of the webpage content different from the media content.

21. The non-transitory computer storage medium of claim 15, where the touchscreen comprises a multi-touch device, the second input is a multi-touch rotate gesture received inside the region of the touchscreen corresponding to the media content after the media player program has been switched from the embedded mode to the focused mode, and the operations further comprise
rotating the media content, by the media player in response to the received second input, while the browser program maintains un-rotated the portion of the webpage content different from the media content.

\* \* \* \* \*